(12) United States Patent
Matranga

(10) Patent No.: US 10,407,089 B1
(45) Date of Patent: Sep. 10, 2019

(54) OFF-ROAD WALKER

(71) Applicant: Caroline Matranga, Laguna Hills, CA (US)

(72) Inventor: Caroline Matranga, Laguna Hills, CA (US)

( * ) Notice: Subject to any disclaimer, the term of this patent is extended or adjusted under 35 U.S.C. 154(b) by 0 days.

(21) Appl. No.: 16/143,219

(22) Filed: Sep. 26, 2018

(51) Int. Cl.
*A47D 13/04* (2006.01)
*B62B 7/00* (2006.01)
*B62B 9/10* (2006.01)
*A47D 1/00* (2006.01)
*A47D 15/00* (2006.01)

(52) U.S. Cl.
CPC .............. *B62B 7/00* (2013.01); *A47D 1/0081* (2017.05); *A47D 13/043* (2013.01); *B62B 9/102* (2013.01); *A47D 15/00* (2013.01)

(58) Field of Classification Search
CPC .............................. A47D 13/04; A47D 13/046
USPC ..................................................... 280/87.051
See application file for complete search history.

(56) References Cited

U.S. PATENT DOCUMENTS

| 3,201,139 | A | * | 8/1965 | Turlington | B62B 5/0423 280/33.994 |
| 3,504,927 | A | * | 4/1970 | Seki | A47D 13/043 280/650 |
| 4,480,846 | A | * | 11/1984 | Sanchez | A47D 13/043 188/174 |
| 4,699,392 | A | * | 10/1987 | Ku | A47D 13/043 280/87.051 |
| 4,799,700 | A | * | 1/1989 | Knoedler | A47D 13/043 108/120 |
| 4,822,030 | A | * | 4/1989 | Cone | A47C 7/006 280/43.24 |
| 4,844,209 | A | * | 7/1989 | Sedlack | A47D 13/043 188/5 |
| 5,203,581 | A | * | 4/1993 | Jankowski | A47D 13/043 16/44 |
| 5,324,064 | A | * | 6/1994 | Sumser | A47D 13/043 108/120 |
| 5,366,231 | A | * | 11/1994 | Hung | A47C 7/006 16/44 |
| 5,447,319 | A | * | 9/1995 | Huang | A47D 13/043 108/120 |
| 5,462,300 | A | * | 10/1995 | Chien | A47C 7/006 188/5 |
| 5,480,210 | A | * | 1/1996 | Lehenbauer | A47D 1/002 297/137 |
| 5,518,475 | A | * | 5/1996 | Garland | A47D 13/043 482/66 |

(Continued)

Primary Examiner — Jeffrey J Restifo

(57) ABSTRACT

An off-road walker is a support apparatus to assist or support an infant or toddler child to be mobile. The off-road walker includes a toy tray, a walker frame, an adjustable support, a plurality of casters, a plurality of frame guards, and a seat assembly. The toy tray supports objects for the child to interact with. The walker frame and the plurality of casters support the weight of the child and the toy tray through the adjustable support. The adjustable support allows the parent to set the distance the toy tray is displaced from the walker frame. The plurality of frame guards protects the walker frame from uneven terrain and can be positioned to assist the parent in maneuvering the off-road walker across the uneven terrain. The seat assembly supports the child and suspends the child from the toy tray and allows the child to rotate within the off-road walker.

13 Claims, 9 Drawing Sheets

(56) References Cited

U.S. PATENT DOCUMENTS

| | | | | |
|---|---|---|---|---|
| 5,564,724 A * | 10/1996 | Huang | A47D 13/043 | 108/120 |
| 5,586,622 A * | 12/1996 | Hu | A47D 13/043 | 188/20 |
| 5,590,892 A * | 1/1997 | Hu | A47D 13/043 | 188/5 |
| 5,688,211 A * | 11/1997 | Myers | A47D 13/107 | 297/5 |
| 5,727,800 A * | 3/1998 | Liu | A47D 13/043 | 188/5 |
| 5,732,961 A * | 3/1998 | Theodoropoulos | A47D 13/043 | 280/87.051 |
| 5,813,681 A * | 9/1998 | Saint | A47D 13/043 | 188/20 |
| 5,865,450 A * | 2/1999 | Ulrich | A47D 13/043 | 280/47.34 |
| 5,865,451 A * | 2/1999 | Hu | A47D 13/043 | 280/47.38 |
| 5,938,218 A * | 8/1999 | Chuang | A47D 1/08 | 280/30 |
| 6,001,047 A * | 12/1999 | Ferrara | A47D 13/043 | 280/87.051 |
| 6,012,731 A * | 1/2000 | Liu | A47D 13/043 | 280/87.051 |
| 6,048,290 A * | 4/2000 | Chen | A47D 13/043 | 280/87.051 |
| 6,120,045 A * | 9/2000 | Rosko | A47D 13/043 | 280/87.021 |
| 6,179,376 B1 * | 1/2001 | Meeker | A47D 13/102 | 248/372.1 |
| 6,224,077 B1 * | 5/2001 | Sheng | A47D 1/008 | 280/87.051 |
| 6,260,867 B1 * | 7/2001 | Yang | A47D 13/043 | 188/20 |
| 6,352,234 B1 * | 3/2002 | Liu | A47D 13/043 | 188/5 |
| 6,386,563 B1 * | 5/2002 | Chen | A47D 13/043 | 280/87.051 |
| 7,007,959 B1 * | 3/2006 | Lu | A47D 13/043 | 280/47.38 |
| 7,025,364 B1 * | 4/2006 | Clarke | A47D 13/04 | 280/47.38 |
| 7,055,836 B2 * | 6/2006 | Cheng | A47D 13/043 | 188/20 |
| 7,935,031 B1 * | 5/2011 | Hsiao | A47D 13/043 | 188/290 |
| 8,016,305 B2 * | 9/2011 | Cheng | A47D 13/043 | 280/87.051 |
| 8,162,333 B1 * | 4/2012 | Bartlett | A47D 1/004 | 280/643 |
| 9,144,324 B1 * | 9/2015 | Champagne | A47D 13/043 | |
| 9,192,247 B1 * | 11/2015 | Lu | A47D 13/043 | |
| 9,610,211 B2 * | 4/2017 | Lai | A61H 3/008 | |
| 10,016,067 B2 * | 7/2018 | Burns | A47D 13/043 | |

* cited by examiner

OFF-ROAD WALKER

FIELD OF THE INVENTION

The present invention relates generally to a walker apparatus for an infant. More specifically, the present invention relates to an infant walker that is capable of adapting to traverse irregular terrain.

BACKGROUND OF THE INVENTION

Child walkers are used to support infants who cannot walk on the infant's own volition or to teach a toddler how to walk to allow the child to be more mobile. Often, a child walker includes wheels to allow the child walker to be mobile as the child learns to walk. The child walker is propelled by a parent or through the child's motion. Traditional child walkers include a tray to support toys, food, or food containers for the child to interact with. The tray additionally provides a buffer extending past the reach of the child to prevent the child from interacting with dangerous appliances, such as an oven, as the tray collides with the appliance.

The present invention is an off-road walker. The present invention seeks to provide a walker for effectively traversing uneven terrain. The present invention utilizes a plurality of frame guards to allow the present invention to accommodate for the uneven terrain. The plurality of frame guards supports the present invention as the present invention is slid across the uneven terrain until the wheels engage the ground surface. Each frame guard is able to rotate about the walker frame to prevent obstruction to motion of the present invention due to obstacles across otherwise smooth surfaces between the surface and the walker frame. The present invention utilizes an adjustable support to allow the present invention to transition between a collapsed configuration for storage and an expanded configuration to receive the child. Additionally, the adjustable support is positioned to accommodate for the child's height to allow the child to interface with the ground surface or to suspend the child above the ground surface.

DETAIL DESCRIPTIONS OF THE INVENTION

All illustrations of the drawings are for the purpose of describing selected versions of the present invention and are not intended to limit the scope of the present invention.

The present invention is an off-road walker. The present invention suspends or supports a child above a ground surface to encourage the child to learn to walk. The present invention additionally accommodates for uneven terrain to allow a parent or adept child to maneuver the off-road walker across the uneven terrain.

Figure 1:
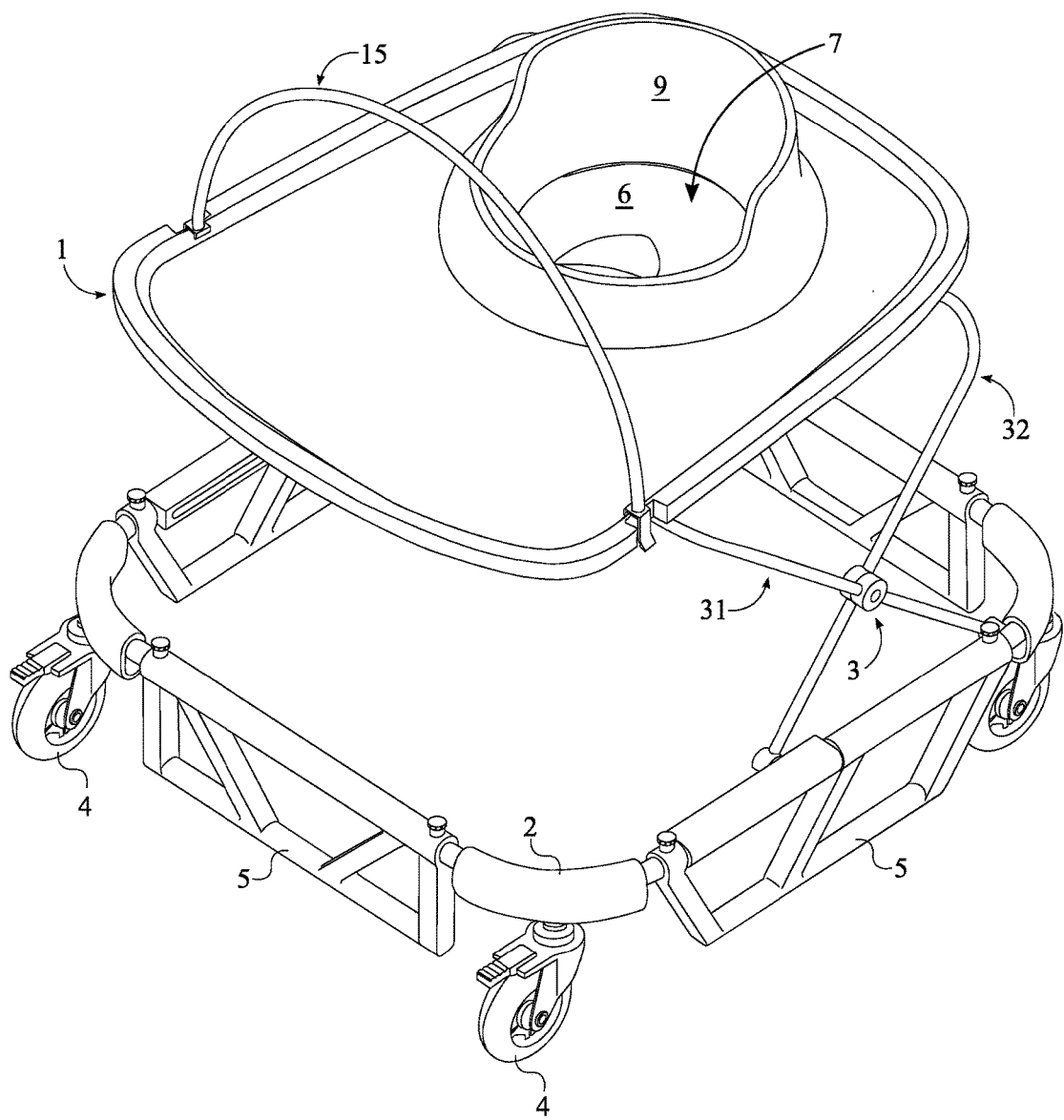
FIG. 1 is a front perspective view of the present invention.
Figure 2:
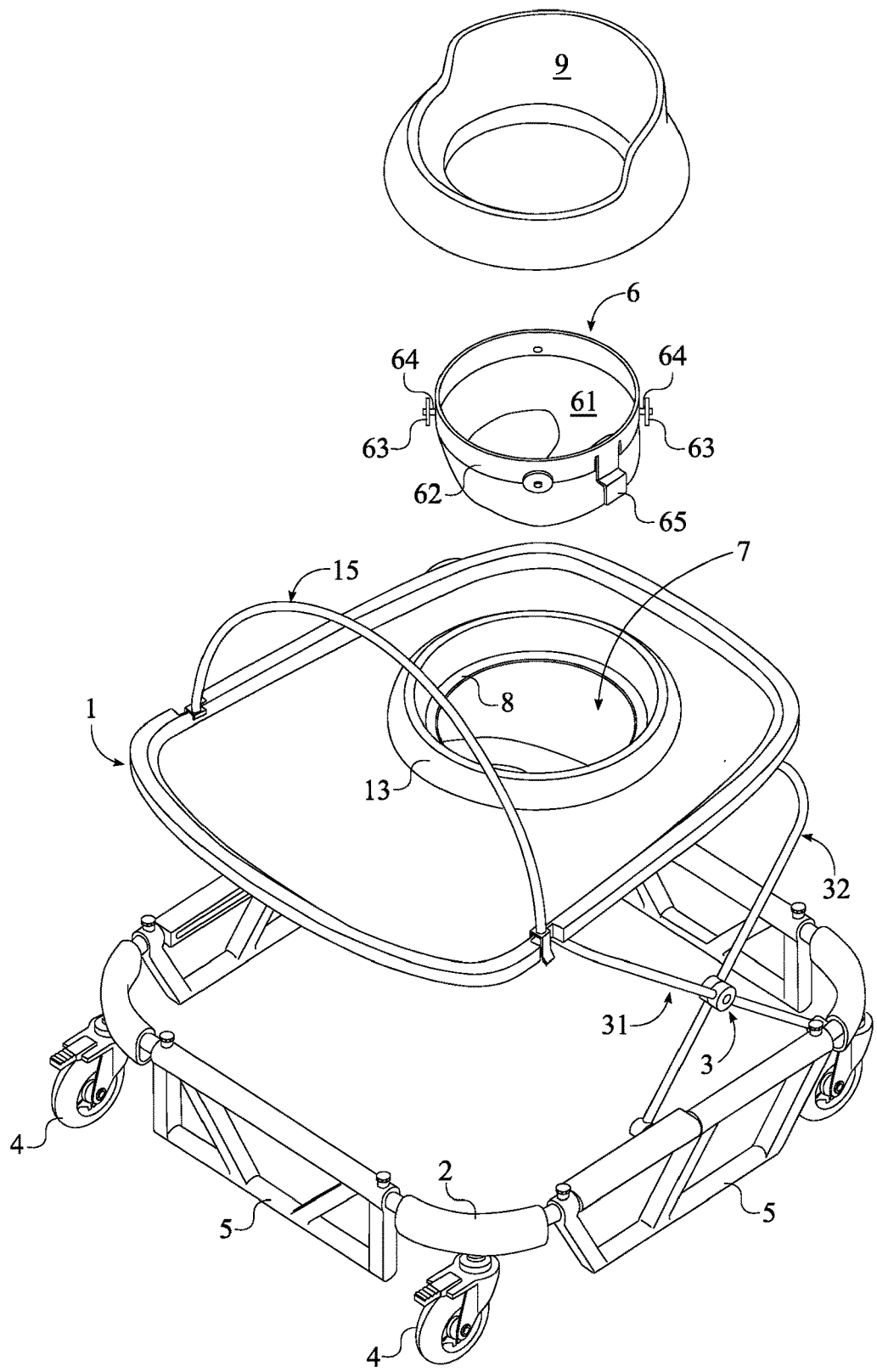
FIG. 2 is an exploded view of the present invention illustrating the seat assembly and the seat back support detached from the toy tray.

Referring to FIG. 1 and FIG. 2, the present invention comprises a toy tray 1, a walker frame 2, an adjustable support 3, a plurality of casters 4, a plurality of frame guards 5, a seat assembly 6, a seat hole 7, a roller track 8, a seat back support 9, and a seat back receiver 13. The toy tray 1 is a surface where toys, food, and food containers are able to be placed for the child to interact with while the child is positioned within the present invention. The walker frame 2 is a support structure that bears the weight of the toy tray 1, the adjustable support 3, the seat assembly 6, the roller track 8, the seat back support 9, the seat back receiver 13, and the child. The adjustable support 3 positions the toy tray 1 relative to the walker frame 2 to allow the present invention to accommodate for the height of the child. The toy tray 1 is adjacently connected to the adjustable support 3. The walker frame 2 is adjacently connected to the adjustable support 3. The toy tray 1 is oppositely positioned to the walker frame 2 about the adjustable support 3. The plurality of casters 4 interfaces with the ground surface to allow the present invention to roll across the ground surface. The plurality of casters 4 is adjacently connected to the walker frame 2. The plurality of casters 4 is oppositely positioned to the toy tray 1 about the walker frame 2 to effectively interface with the ground surface while offsetting the toy tray 1 from the ground surface. The plurality of casters 4 is evenly distributed about the walker frame 2 to distribute the weight of the present invention across each caster of the plurality of casters 4. The plurality of frame guards 5 protects the walker frame 2 and supports the present invention across uneven terrain. The plurality of frame guards 5 is rotatably connected to the walker frame 2 to allow each frame guard 5 to be independently oriented towards the plurality of casters 4 to interface with the uneven terrain or away from the plurality of casters 4 to provide clearance between the ground surface and the walker frame 2. Each frame guard 5 of the plurality of frame guards 5 is positioned between a corresponding pair of casters from the plurality of casters 4 to support the present invention across uneven terrain between the pair of casters from the plurality of casters 4.

Referring to FIG. 2, the seat assembly 6 supports the child and allows the child to rotate within the present invention. The seat hole 7 traverses through the toy tray 1 to provide an opening that receives the seat assembly 6 within during the implementation of the present invention. The roller track 8 is a channel that receives the seat assembly 6 to allow the seat assembly 6 to rotate within the toy tray 1. The roller track 8 is perimetrically connected to the toy tray 1 about the seat hole 7. The seat assembly 6 is positioned within the seat hole 7. The seat assembly 6 rotatably engages the roller track 8 such that a child supported by the seat assembly 6 is able to rotate within the seat hole 7. The seat back receiver 13 secures the seat back support 9 onto the toy tray 1. The seat back receiver 13 is adjacently connected to the toy tray 1 about the roller track 8. The seat back support 9 is a backrest to support the posture of the child. The seat back support 9 rotatably engages with the seat back receiver 13 such that the seat back support 9 rotates with the child to provide continuous posture support.

Figure 3:
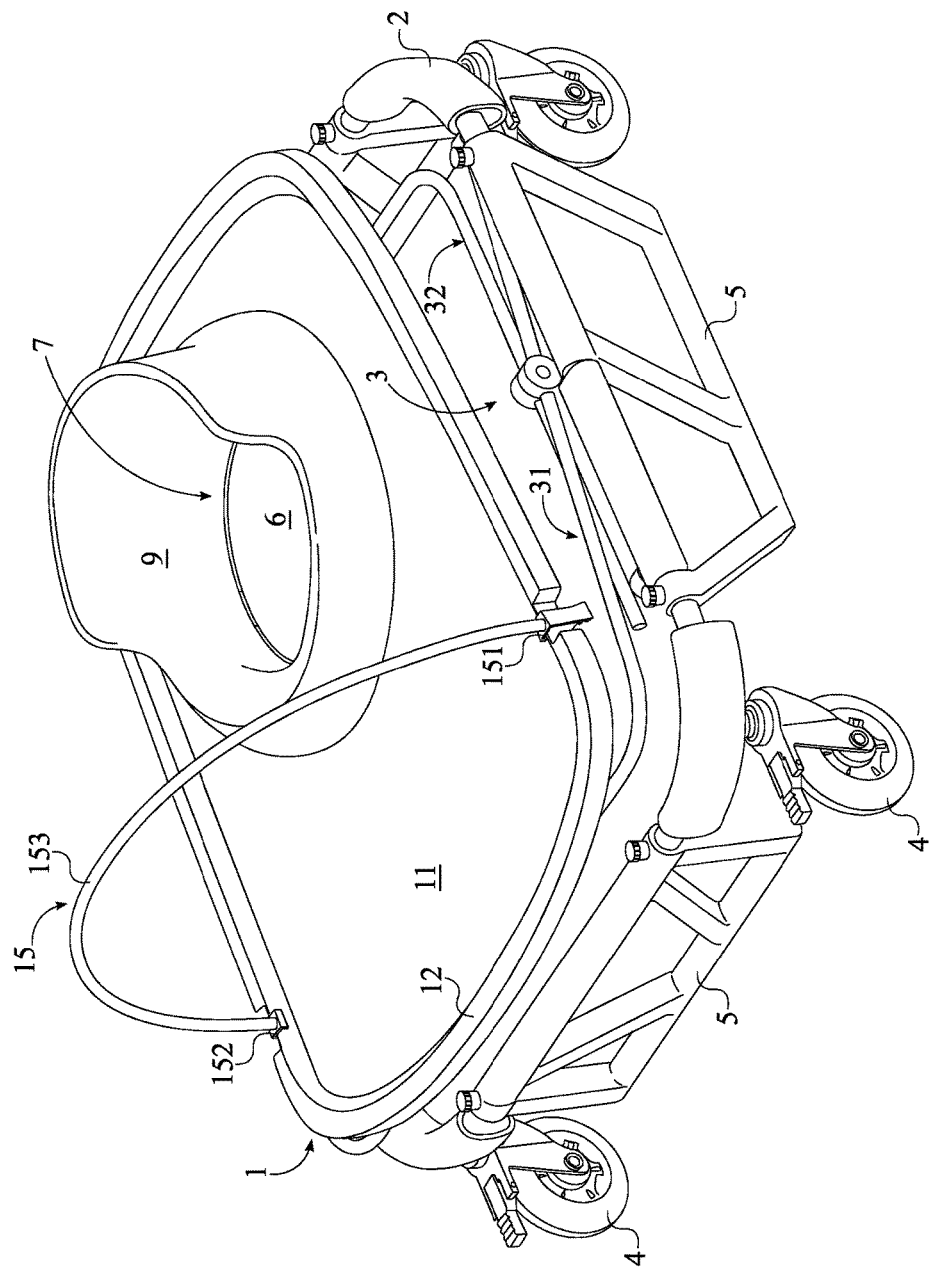
FIG. 3 is a front perspective view of the present invention illustrating the adjustable support in the collapsed position.

Referring to FIG. 3, in accordance to the preferred embodiment of the present invention, the adjustable support 3 comprises a first support 31 and a second support 32. The first support 31 and the second support 32 evenly distribute the weight of the toy tray 1, the seat assembly 6, the seat back support 9, and the child positioned within the present invention across the walker frame 2. The first support 31 is pivotably connected to the walker frame 2. The second support 32 is slideably connected to the walker frame 2. The first support 31 is slideably connected to the toy tray 1. The second support 32 is adjacently connected to the toy tray 1. The first support 31 is pivotably connected to the second support 32 between the toy tray 1 and the walker frame 2. In this configuration, the present invention is able to transition between a collapsed configuration and an expanded configuration as the first support 31 slides along the toy tray 1 and the second support 32 simultaneously slides along the walker frame 2. In the collapsed configuration, the toy tray 1 is positioned adjacent to the walker frame 2 to allow the present invention to be stored more efficiently by reducing the volume the present invention occupies. In the expanded configuration, the toy tray 1 is displaced from the walker frame 2 to accommodate the height of the child placed within the present invention.

Figure 4:
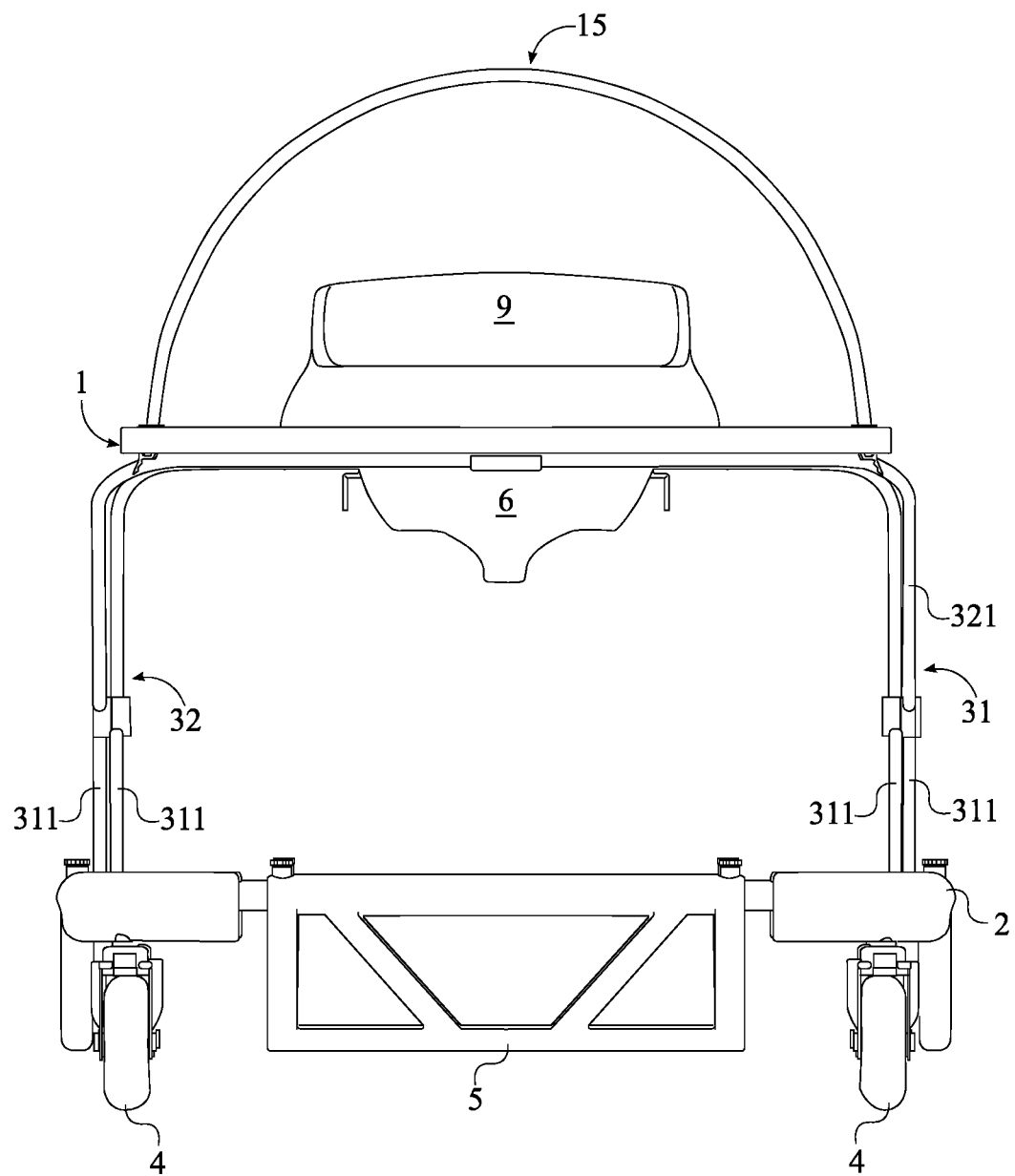
FIG. 4 is a front plan view of the present invention illustrating the connecting strut of the first support.
Figure 5:
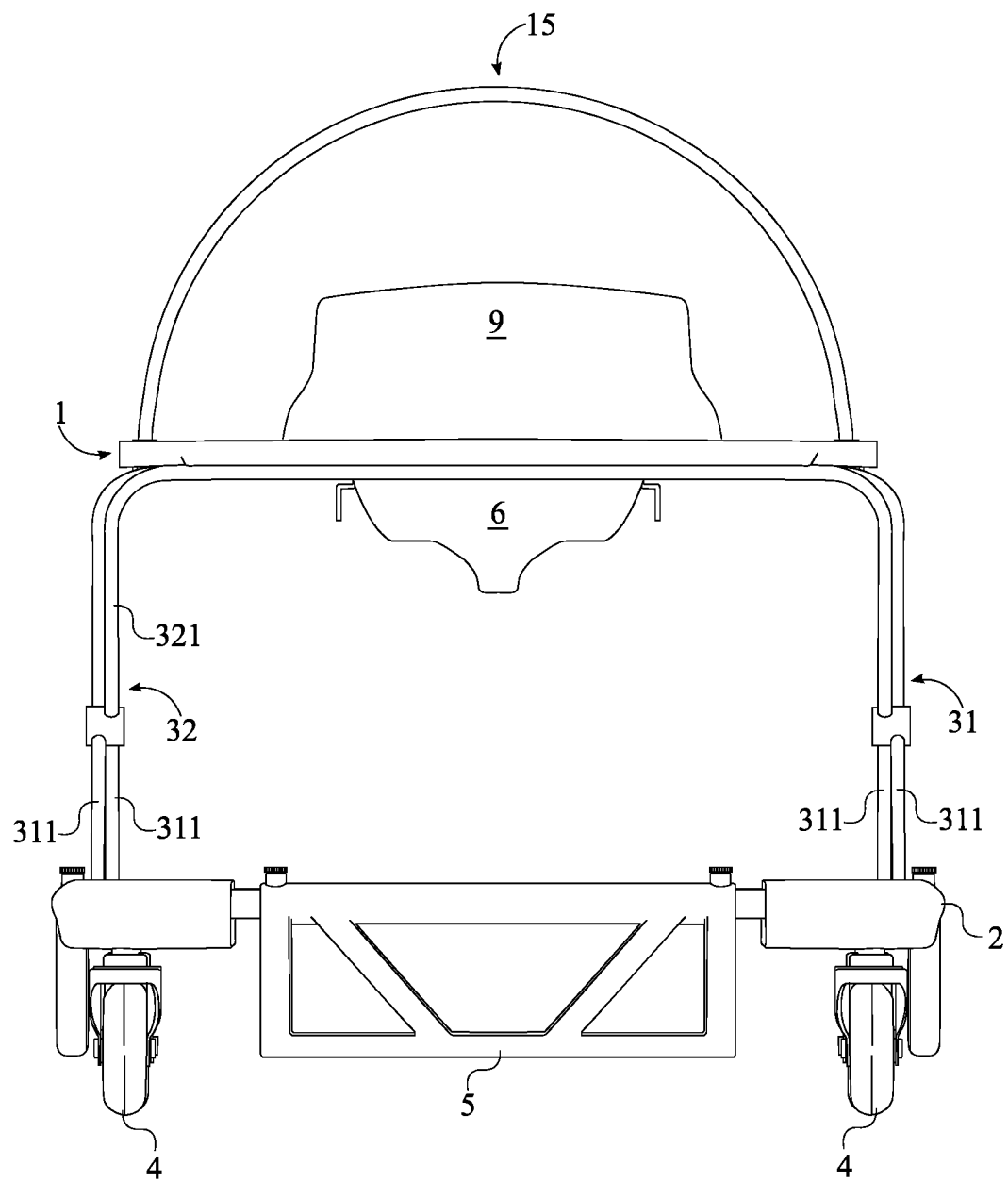
FIG. 5 is a rear plan view of the present invention illustrating the connecting strut of the second support.

Referring to FIG. 4 and FIG. 5, in accordance to a specific embodiment of the present invention, the first support 31 and the second support 32 each comprises a pair of supporting struts 311 and a connecting strut 321. Each supporting strut 311 is perpendicularly connected to the connecting strut 321. The pair of supporting struts 311 is oppositely positioned to each other along the connecting strut 321, in order to support the toy tray 1, the seat assembly 6, and the weight of the child onto the connecting strut 321 and distribute the weight across the walker frame 2 through each supporting strut 311. The pair of supporting struts 311 of the first support 31 is pivotably connected to the walker frame 2. The pair of supporting struts 311 of the second support 32 is slideably connected to the walker frame 2. The connecting strut 321 of the first support 31 is slideably connected to the toy tray 1. The connecting strut 321 of the second support 32 is adjacently connected to the toy tray 1. Each supporting strut 311 of the first support 31 is pivotably connected to a corresponding supporting strut from the pair of supporting struts 311 of the second support 32, such that the first support 31 translates similarly to the second support 32. In this configuration, the pair of supporting struts 311 of the second support 32 translates along the walker frame 2 and the connecting strut 321 of the first support 31 translates along the toy tray 1 to transition the present invention between the collapsed configuration and the expanded configuration.

Figure 6:
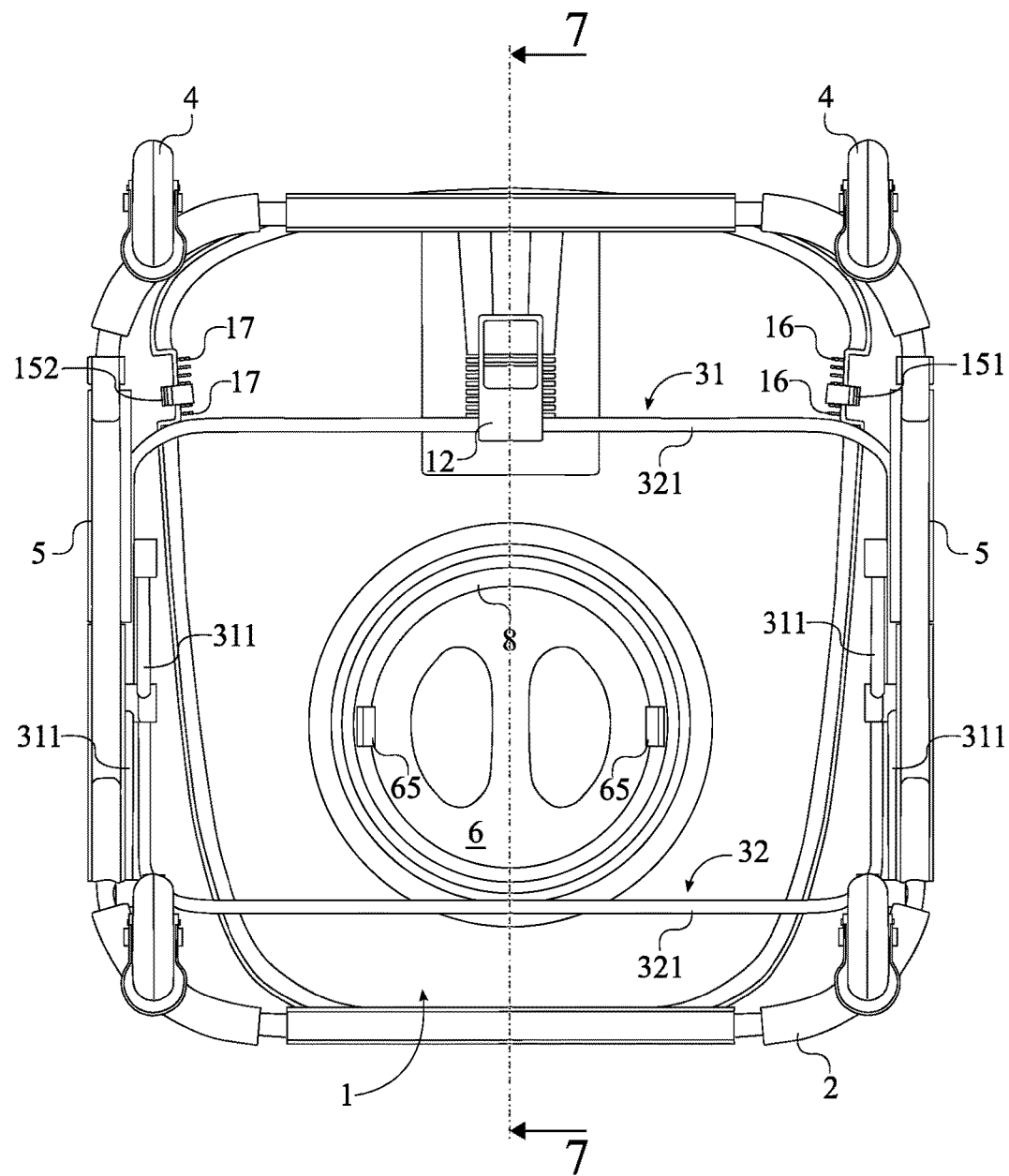
FIG. 6 is a bottom plan view of the present invention illustrating the connection between the first support and the height-positioning mechanism.

Referring to FIG. 6, still in accordance to the preferred embodiment of the present invention, the present invention comprises a height-positioning mechanism 12. The height-positioning mechanism 12 secures the first support 31 in a plurality of discrete positions such that the distance between the toy tray 1 and the walker frame 2 corresponds to a discrete position of the plurality of discrete positions. The height-positioning mechanism 12 is adjacently connected to the toy tray 1. The first support 31, more specifically the connecting strut 321 of the first support 31, is slideably engaged with the toy tray 1 through the height-positioning mechanism 12. In some embodiments of the present invention, the present invention comprises a position lock. The position lock prevents the first support 31 from adversely translating within the height-positioning mechanism 12. The position lock being adjacently connected to the first support 31. The position lock being adjacently positioned to the height-positioning mechanism 12. The position lock selectively engaging the height-positioning mechanism 12, such that the parent is able to disengage the position lock to translate the first support 31 within the height-positioning mechanism 12.

Figure 7:
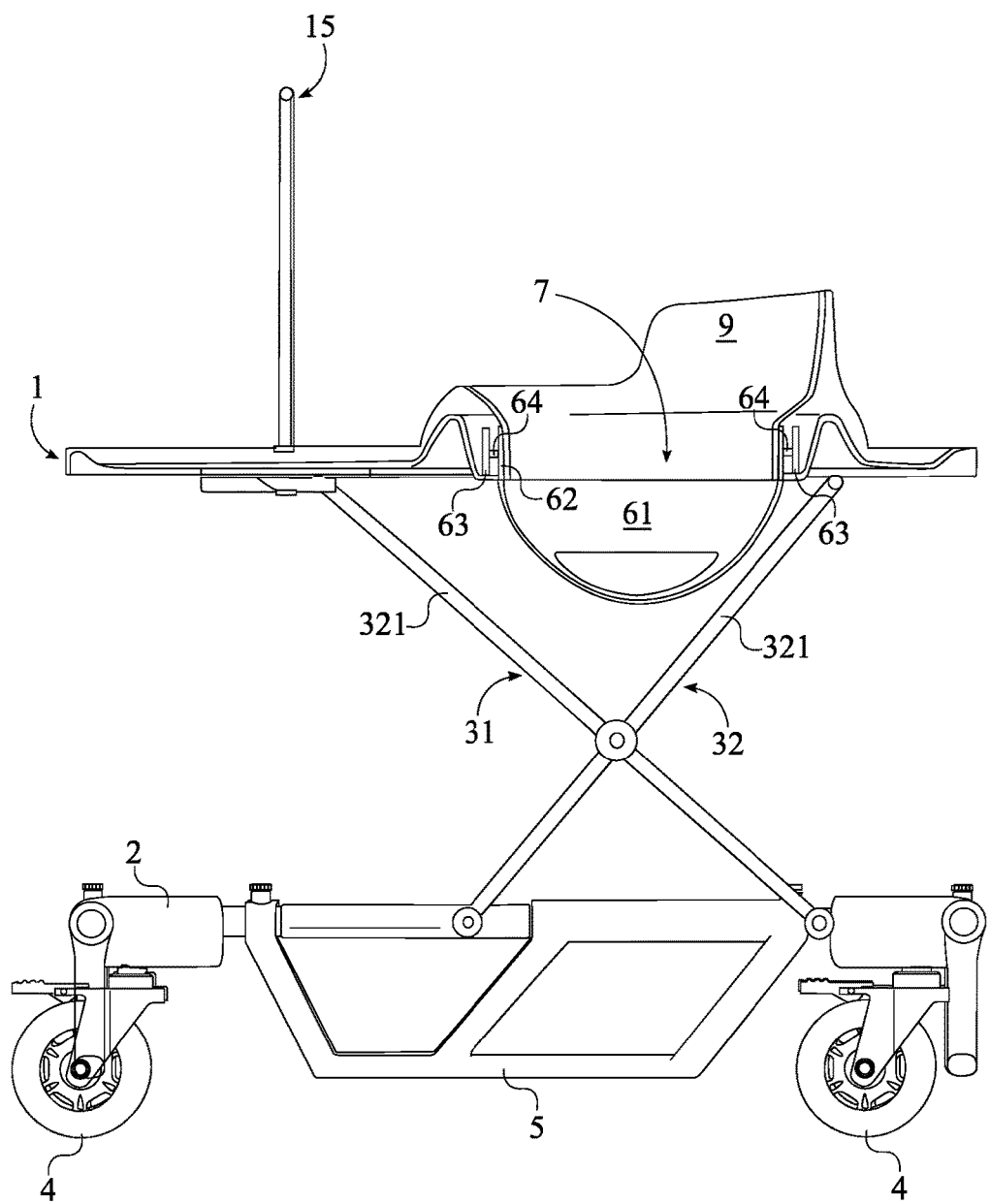
FIG. 7 is a side cross-section view taken along line 7-7 in FIG. 6 illustrating the plurality of wheels riding along the roller track.

Referring to FIG. 2, FIG. 6, and FIG. 7, further in accordance to the preferred embodiment of the present invention, the seat assembly 6 comprises a support seat 61, an assembly collar 62, a plurality of wheels 63, a plurality of wheels supports 64, and a pair of collar clips 65. The support seat 61 bears the weight of a child positioned within the present invention. The assembly collar 62 transfers the weight of the child from the support seat 61 through the plurality of wheel supports 64 and the plurality of wheels 63 to the roller track 8. The support seat 61 is perimetrically connected to the assembly collar 62. Each of the plurality of wheel supports 64 is normally and externally connected to the assembly collar 62. Each of the plurality of wheels 63 is normally and rotatably connected to a corresponding wheel support of the plurality of wheel supports 64, such that each of the plurality of wheels 63 is offset from the assembly collar 62. Each of the plurality of wheels 63 is slotted into the roller track 8, such that the seat assembly 6 is able to rotate within the seat hole 7. Therefore, the child is able to spin around completely while seated within the seat assembly 6. The pair of collar clips 65 prevents the seat assembly 6 from being removed from the seat hole 7. The pair of collar clips 65 is adjacently connected to the assembly collar 62. The pair of collar clips 65 is adjacently positioned to the support seat 61. The support seat 61 and the pair of collar clips 65 are oriented towards the walker frame 2. The roller track 8 is selectively positioned between the plurality of wheels 63 and the pair of collar clips 65 to secure the seat assembly 6 to the roller track 8, while allowing the seat assembly 6 to be removed by the parent.

Referring to FIG. 3 and FIG. 6, in some embodiments of the present invention, the present invention comprises a toy hoop 15. The toy hoop 15 is a support structure which toys can be hung for the child to interact. The toy hoop 15 comprises a first tray clip 151, a second tray clip 152 and a hoop frame 153. The first tray clip 151 and the second tray clip 152 secure the hoop frame 153 onto the toy tray 1. The hoop frame 153 allows for toys to be attached to hang the toys in front of the child or allows covers to be attached to reduce the child's exposure to sun. The first tray clip 151 is adjacently connected to the hoop frame 153. Similarly, the second tray clip 152 is adjacently connected to the hoop frame 153. The first tray clip 151 is oppositely positioned to the second tray clip 152 along the hoop frame 153. The first tray clip 151 selectively engages the toy tray 1 to allow the toy hoop 15 to be removed by the parent. Similarly, the second tray clip 152 selectively engages the toy tray 1 to allow the toy hoop 15 to be removed by the parent. The first tray clip 151 being oppositely positioned to the second tray clip 152 across the toy tray 1 in order to effectively support the hoop frame 153 above the toy tray 1.

Referring more specifically to FIG. 6, in a more specific embodiment of the present invention, the present invention comprises a first plurality of positioning extrusions 16 and a second plurality of positioning extrusions 17. The first plurality of positioning extrusions 16 and the second plurality of positioning extrusions 17 allow the toy hoop 15 to be offset at intervals from the child to compensate for the reach of the child to interact with toys attached to the toy hoop 15. The first plurality of positioning extrusions 16 is adjacently connected to the toy tray 1. The first plurality of positioning extrusions 16 is positioned between the toy tray 1 and the walker frame 2. Similarly, the second plurality of positioning extrusions 17 is adjacently connected to the toy tray 1. The second plurality of positioning extrusions 17 is positioned between the toy tray 1 and the walker frame 2. The first plurality of positioning extrusions 16 is oppositely positioned to the second plurality of positioning extrusion across the toy tray 1 to effectively position the toy hoop 15. Further, each positioning extrusion from the first plurality of positioning extrusions 16 is offset from each other. The first tray clip 151 engages the toy tray 1 between a corresponding pair of extrusions from the first plurality of positioning extrusions 16, in order to prevent the first tray clip 151 from translating along the toy tray 1. Similarly, each positioning extrusion from the second plurality of positioning extrusions 17 is offset from each other. The second tray clip 152 engages the toy tray 1 between a corresponding pair of extrusions from the second plurality of positioning extrusions 17 in order to prevent the second tray clip 152 from translating along the toy tray 1.

Referring more specifically to FIG. 3, still in accordance to the preferred embodiment of the present invention, the toy tray 1 comprises a tray base 11 and a tray lip 19. The tray base 11 supports toys, food, or food containers while the tray lip 19 prevents objects on the tray base 11 from sliding off the tray base 11 during implementation. The tray lip 19 is perimetrically connected to the tray base 11. The tray lip 19 is oppositely oriented to the walker frame 2 to contain any object placed on the tray base 11 and prevents such objects from sliding off of the tray base 11. The seat hole 7 traverses through the tray base 11. The roller track 8 is connected to the tray base 11 about the seat hole 7 to allow the child to rotate within the present invention.

Figure 8:
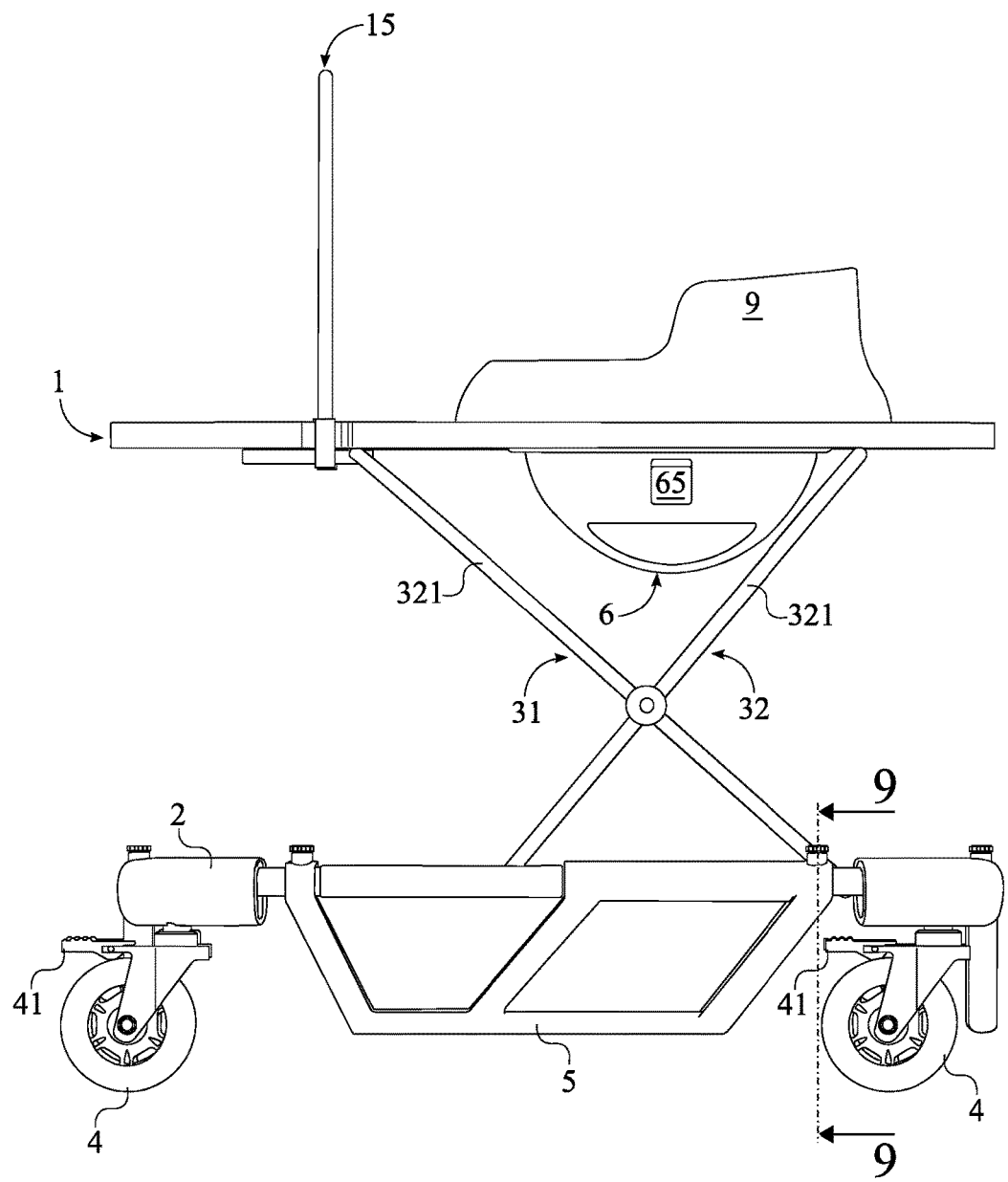
FIG. 8 is a side view of the present invention.
Figure 9:
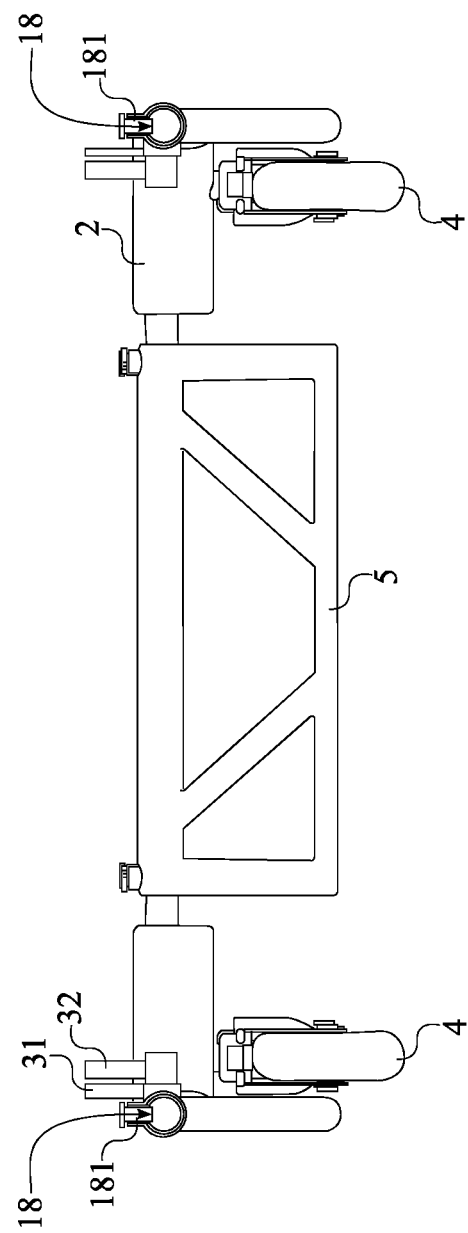
FIG. 9 is a cross-section view taken along line 9-9 in FIG. 8 illustrating the spring-loaded pin mounted inside each of the plurality of locking holes.

Referring to FIG. 8 and FIG. 9, further in accordance to the preferred embodiment of the present invention, the present invention comprises a plurality of locking holes 18 and each of the plurality of frame guards 5 comprises at least one spring-loaded pin 181. The spring-loaded pin 181 for each frame guard of the plurality of frame guards 5 engages a locking hole from the plurality of locking holes 18 to secure the frame guard and prevent the frame guard from freely rotating about the walker frame 2. Each spring-loaded pin 181 is oriented towards the walker frame 2. Each locking hole from the plurality of locking holes 18 traverses into the walker frame 2. Each spring-loaded pin 181 is adjacently positioned to a corresponding locking hole of the plurality of locking holes 18. Each spring-loaded pin 181 selectively engages the corresponding locking hole 18 in order to prevent the rotation of the corresponding frame guard about the walker frame 2. More specifically, each locking hole is preferred to be normally oriented to the toy tray 1 and each locking hole is diametrically opposed to another locking hole of the plurality of locking holes 18 about the walker frame 2. In this specific embodiment, each frame guard 5 is able to be positioned in a terrain-interfacing configuration or a clearance configuration. In the terrain-interfacing configuration, the spring-loaded pin 181 of a corresponding frame guard of the plurality of frame guards 5 engages a locking hole of the plurality of locking holes 18 that is oppositely positioned to the plurality of casters 4 about the walker frame 2. The corresponding frame guard is oriented away from the toy tray 1, such that the frame guard 5 is able to support the present invention across uneven terrain. In the clearance configuration, a frame guard of the plurality of frame guards 5 is oriented towards the toy tray 1 in order to provide additional void space between the ground surface and the walker frame 2.

Still in accordance to the preferred embodiment of the present invention, each of the plurality of casters 4 is preferred to be a locking caster. The locking caster allows the parent to prevent the rotation of a wheel of the locking caster. Restricting the rotation of the wheel, allows the parent to have better control of the present invention to prevent the present invention from moving unintendedly.

Although the invention has been explained in relation to its preferred embodiment, it is to be understood that many other possible modifications and variations can be made without departing from the spirit and scope of the invention as hereinafter claimed.

What is claimed is:

1. An off-road walker comprising:
a toy tray;
a walker frame;
an adjustable support;
a plurality of casters;
a plurality of frame guards;
a seat assembly;
a seat hole;
a roller track;
a seat back support;
a seat back receiver;
the toy tray being adjacently connected to the adjustable support;
the walker frame being adjacently connected to the adjustable support;
the toy tray being oppositely positioned to the walker frame about the adjustable support;
the plurality of casters being adjacently connected to the walker frame;
the plurality of casters being oppositely positioned to the toy tray about the walker frame;
the plurality of casters being evenly distributed about the walker frame;
the plurality of frame guards being rotatably connected to the walker frame;
each frame guard of the plurality of frame guards being positioned between a corresponding pair of casters from the plurality of casters;
the seat hole traversing through the toy tray;
the roller track being perimetrically connected to the toy tray about the seat hole;
the seat assembly being positioned within the seat hole;
the seat assembly rotatably engaging the roller track;
the seat back receiver being adjacently connected to the toy tray about the roller track;
the seat back support rotatably engaging the seat back receiver;
a toy hoop;
the toy hoop comprising a first tray clip, a second tray clip, and a hoop frame;
the first tray clip being adjacently connected to the hoop frame;
the second tray clip being adjacently connected to the hoop frame;
the first tray clip being oppositely positioned to the second tray clip along the hoop frame;
the first tray clip selectively engaging the toy tray;
the second tray clip selectively engaging the toy tray; and
the second tray clip being oppositely positioned to the first tray clip across the toy tray.

2. The off-road walker, as claimed in claim 1, comprising:
the adjustable support comprising a first support and a second support;
the first support being pivotably connected to the walker frame;
the second support being slideably connected to the walker frame;

the first support being slideably connected to the toy tray;
the second support being adjacently connected to the toy frame; and
the first support being pivotably connected to the second support, between the toy tray and the walker frame.

3. The off-road walker, as claimed in claim 2, comprising:
the first support and the second support each comprise a pair of supporting struts and a connecting strut;
each supporting strut being perpendicularly connected to the connecting strut;
the pair of supporting struts being oppositely positioned to each other along the connecting strut;
the pair of supporting struts of the first support being pivotably connected to the walker frame;
the pair of supporting struts of the second support being slideably connected to the walker frame;
the connecting strut of the first support being slideably connected to the toy tray;
the connecting strut of the second support being adjacently connected to the toy tray; and
each supporting strut of the first support being pivotably connected to a corresponding supporting strut from the pair of supporting struts of the second support.

4. The off-road walker, as claimed in claim 2, comprising:
a height-positioning mechanism;
the height-positioning mechanism being adjacently connected to the toy tray; and
the first support being slidably engaged with the toy tray through the height-positioning mechanism.

5. The off-road walker, as claimed in claim 1, comprising:
the seat assembly comprising a support seat, an assembly collar, a plurality of wheels, a plurality of wheel supports, a pair of collar clips;
the support seat being perimetrically connected to the assembly collar;
each of the plurality of wheel supports being normally and externally connected to the assembly collar;
each of the plurality of wheels being normally and rotatably connected to a corresponding wheel support of the plurality of wheel supports;
each of the plurality of wheels being slotted into the roller track;
the pair of collar clips being adjacently connected to the assembly collar;
the pair of collar clips being adjacently positioned to the support seat;
the support seat and the pair of collar clips being oriented towards the walker frame; and
the roller track being positioned between the plurality of wheels and the pair of collar clips.

6. The off-road walker, as claimed in claim 1, comprising:
a first plurality of positioning extrusions;
a second plurality of positioning extrusions;
the first plurality of positioning extrusions being adjacently connected to the toy tray;
the second plurality of positioning extrusions being adjacently connected to the toy tray;
the first plurality of positioning extrusions being positioned between the toy tray and the walker frame;
the second plurality positioning extrusions being positioned between the toy tray and the walker frame; and
the first plurality of positioning extrusions being oppositely positioned to the second plurality of positioning extrusions across the toy tray.

7. The off-road walker, as claimed in claim 6, comprising:
each positioning extrusion of the first plurality of positioning extrusions being offset from each other; and
the first tray clip engaging the toy tray between a corresponding pair of extrusions from the first plurality of positioning extrusions.

8. The off-road walker, as claimed in claim 6, comprising:
each positioning extrusion of the second plurality of positioning extrusions being offset from each other; and
the second tray clip engaging the toy tray between a corresponding pair of extrusions from the second plurality of positioning extrusions.

9. The off-road walker, as claimed in claim 1, comprising:
the toy tray comprising a tray base and a tray lip;
the tray lip being perimetrically connected to the tray base;
the tray lip being oppositely oriented to the walker frame; and
the seat hole traversing through the tray base.

10. The off-road walker, as claimed in claim 1, comprising:
a plurality of locking holes;
each of the plurality of frame guards comprising at least one spring-loaded pin;
each spring-loaded pin being oriented towards the walker frame;
each locking hole of the plurality of locking holes traversing into the walker frame;
each spring-loaded pin being adjacently positioned to a corresponding locking hole of the plurality of locking holes; and
each spring-loaded pin selectively engaging the corresponding locking hole.

11. The off-road walker, as claimed in claim 10, wherein each locking hole being normally oriented to the toy tray.

12. The off-road walker, as claimed in claim 10, wherein each locking hole being diametrically opposed to another locking hole of the plurality of locking holes about the walker frame.

13. The off-road walker, as claimed in claim 1, wherein each of the plurality of casters is a locking caster.

* * * * *